United States Patent [19]

Witherspoon et al.

[11] 4,007,059

[45] Feb. 8, 1977

[54] ELECTROCHEMICAL CELL ELECTRODE SEPARATOR AND METHOD OF MAKING IT AND FUEL CELL CONTAINING SAME

[75] Inventors: Romeo Richard Witherspoon, Utica; Edward Marion Domanski, Warren; James Alvin Davis, Madison Heights, all of Mich.

[73] Assignee: General Motors Corporation, Detroit, Mich.

[22] Filed: Aug. 20, 1975

[21] Appl. No.: 605,985

[52] U.S. Cl. .................................. 429/9; 429/34; 429/40; 429/46

[51] Int. Cl.² .................. H01M 8/02; H01M 2/00

[58] Field of Search ........ 136/144, 145, 146, 86 A, 136/148

[56] References Cited
UNITED STATES PATENTS

| | | | |
|---|---|---|---|
| 3,246,767 | 4/1966 | Pall et al. | 136/146 |
| 3,342,642 | 9/1967 | Barber | 136/146 |
| 3,594,233 | 7/1971 | Charkey et al. | 136/86 A |
| 3,607,423 | 9/1971 | Bertioli | 136/86 A |
| 3,704,221 | 11/1972 | McCully | 136/146 |

Primary Examiner—John H. Mack
Assistant Examiner—H. A. Feeley
Attorney, Agent, or Firm—Robert J. Wallace

[57] ABSTRACT

An ion permeable material particularly useful for electrode separators. The material is a uniform mixture of 30 to 70% by weight colloidal size asbestos fibers and 20 to 40% by weight unsintered fine polytetrafluoroethylene fibers, bonded together with uniformly dispersed particles of a fluorinated ethylene-propylene copolymer comprising about 5 to 15% by weight of the material. Colloidal size particles of an alkaline earth metal oxide are dispersed throughout the material. The material is initially prepared in a modified paper making process and then heated to a temperature high enough to fuse the fluorinated ethylene-propylene copolymer but not high enough to sinter the polytetrafluoroethylene fibers. An improved zinc-air hybrid fuel cell and an improved silver oxide-zinc secondary battery are made possible with electrode separators such as described herein.

6 Claims, 4 Drawing Figures

ELECTROCHEMICAL CELL ELECTRODE SEPARATOR AND METHOD OF MAKING IT AND FUEL CELL CONTAINING SAME

BACKGROUND OF THE INVENTION

This invention relates to an improved ion permeable membrane, and more particularly to an improved battery electrode separator material and to a method of making it. Improved electrochemical cells of various types are made possible with this separator material.

Ion permeable materials have been used for a long time as electrode separators and half cell dividers for electrochemical cells. Early ion permeable battery separators were made of wood, paper and other cellulosic type materials. However, these types of materials suffer from many disadvantages, including that they tend to degrade with age. Accordingly, ion permeable battery separators made with other materials, including synthetics, have been developed. Separators have been made of asbestos. They have also been made of sintered polytetrafluoroethylene particles, as well as with sintered polyethylene.

In general, separators made with synthetic materials are improved in that they are more resistant to chemical attack. On the other hand, they are less wettable. Moreover, when made with a suitably small pore size, they tend to present greater electrical resistance between cell electrodes than natural materials. If made sufficiently thin to reduce this electrical resistance, they may become mechanically weak, dimensionally unstable, and more subject to electrode dendrite penetration.

We have now found an improved material for use as an ion permeable barrier in electrochemical cells. It has high mechanical strength, improved mechanical and chemical stability, and higher ion permeability. Our seprator material has proven to be exceptionally resistant to penetration by zinc dendrites, making this material particularly useful in secondary batteries having zinc anodes. Our seprator material is readily and thoroughly wettable by alkaline electrolytes, yet has an extremely high resistance to chemical attack by them. In addition, wet strength of our new separator material is exceptionally high, making further improvements in a zinc-air hybrid fuel cell possible.

OBJECTS AND SUMMARY OF THE INVENTION

Among the objects of this invention is to provide a new ion permeable electrochemical separator material, and separators made of this material.

It is also an object of this invention to provide a method of making a new ion permeable separator material.

Still further objects of the invention are to provide new electrochemical cell combinations employing ion permeable separators made with this new material, particularly an improved zinc secondary battery and an improved zinc-air hybrid fuel cell.

These and other objects of the invention are attained with a separator material that is a uniform mixture of 30 to 70% by weight colloidal size asbestos fibres and 20 to 40% by weight unsintered fine polytetrafluoroethylene fibres bonded together with uniformaly dispersed fluorinated ethylene-propylene copolymers comprising about 5 to 20% by weight of the separator material. At least about 10% by weight of an alkaline earth metal oxide is also included in the separator material as formed. Subsequent impregnation of the material with added amounts of alkaline earth metal oxide enhance resistance to zinc dendrite penetration without deleteriously affecting other desirable properties, particularly strength. A modified paper making process is used to form a thin film of separator material constituents. The film is then dried and heated to a temperature sufficient to fuse the fluorinated ethylene-propylene copolymer particles but insufficient to sinter the polytetrafluoroethylene particles. The copolymer appears to bond the polytetrafluoroethylene and asbestos fibers into a coherent matrix. A new rechargeable zinc-air fuel cell is described. The fuel cell has anode and cathode chambers having a common wall therebetween formed with the separator material of this invention. The wall is subjected to a significant gas pressure during cell recharge. A zinc-silver oxide secondary battery is also described that has an electrode separator made in accordance with this invention.

DESCRIPTION OF THE PREFERRED EMBODIMENTS

Figure 1:
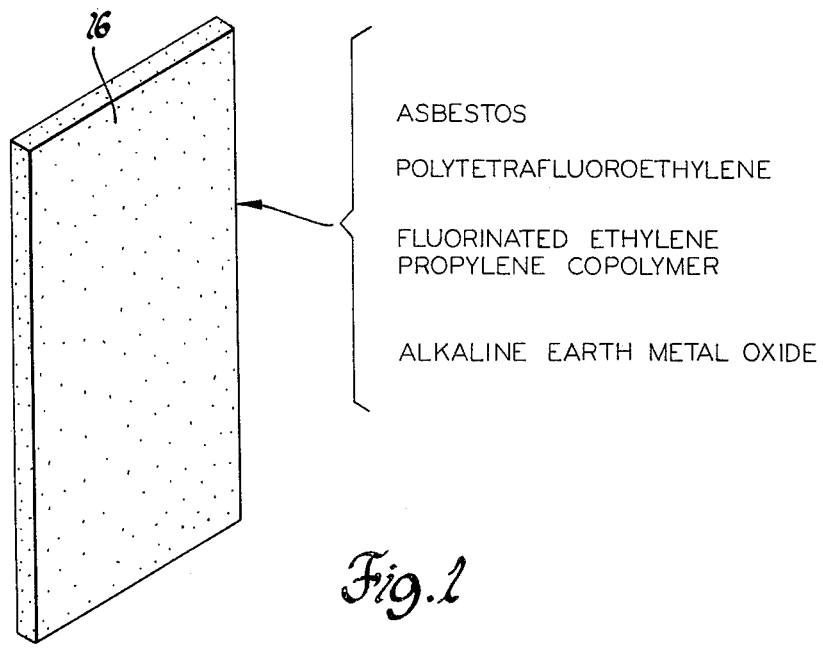
FIG. 1 shows a perspective elevational view of a flat sheet-like electrochemical cell separator made in accordance with this invention.

The separator of this invention contains alkaline earth metal oxide particles, asbestos fibers, and polytetrafluoroethylene fibers bonded together with uniformly dispersed particles of a fluorinated ethylene-propylene copolymer. Separators having a thickness of about 0.0025 to 0.015 inch are generally useful. However, we prefer a separator thickness of about 0.005 to 0.010 inch.

The alkaline earth metal oxide is included to increase wettability, hydrophilicity, of the separator, particularly with respect to highly alkaline aqueous based electrolytes such as concentrated potassium hydroxide. It helps overcome the hydrophobic effects of the plastic fibers and bonding particles in the separator material. It also serves to reduce pore size in the separator material when present in higher weight proportions. While alkaline earth metal oxides of calcium, strontium and barium can be used, exceptionally good results have been obtained with magnesium oxide. At least 10% by weight oxide is included in the separator material as formed, resulting in a uniform dispersion throughout the separator material. In such instance the asbestos and polytetrafluoroethylene fibers and copolymer particles are effectively coated with a layer of oxide. This also may aid in maintaining a small pore size in the separator, without increasing its electrical resistance characteristics. On the other hand, oxide proportions above about 15% by weight are generally not desired in the separator as formed. These higher proportions tend to degrade separator strength. If the higher oxide proportions are desired, for example to further improve resistance to zinc dendrite penetration, the higher proportion should be added after the separator has been formed. In this way, as formed separator pore sizes of about 50 – 100 angstroms, preferably less than about 50 angstroms, can be reduced to about 10– 25 angstroms, where resistance to zinc dendrite penetration is especially effective. In this connection any desired weight proportion of the oxide can be subsequently added, without detrimental effect on strength.

The added oxide content can be produced by brushing, spraying, dipping or otherwise coating and impregnating the separator in any technique that will produce sub-colloidal size, less than 1 micron, oxide particles. Oxide particle sizes of 0.1 – 0.2 microns or less are preferred.

It is preferred that both the original and added oxide be produced in situ. The sub-colloidal particle size is readily produced in situ from an alcohol or alcohol-water solution of alkaline earth metal carboxylate, and converting the carboxylate into the corresponding alkaline earth metal oxide or hydroxide. Heating at 120° – 285° C. for 5 – 10 minutes will convert the carboxylate into the oxide. Reaction of the carboxylate with an alkanlie medium, e.g. concentrated potassium hydroxide, will produce the hydroxide. Carboxylates that can be used include non-soap derivatives of a lower fatty acid (i.e., formatescoprylates) and derivatives of the di- and hydroxy-acids which are soluble in alcohol or alcohol-water mixtures. An alcohol-water solution containing about 100 – 300 grams per liter of magnesium or calcium acetate is preferred as a solution for adding more oxide to the separator after it is formed. Such salts are precursors of the oxide. Since the hydroxide can be considered as a hydrated oxide, it too is considered a precursor of the oxide for purposes of this invention.

The asbestos fibers improve ionic permeability and also help increase wettability of the separator material. Asbestos fibers treated to remove traces of ferrous and other heavy metals are preferred. At least about 30% by weight are necessary to obtain any noticeable benefits. However, we prefer to use about 40 to 65% by weight of asbestos. Greater than about 70% by weight is generally not preferred because such proportions tend to decrease the mechanical strength. Asbestos fibers having a length of about 5 to 10 microns can be used, with an average fiber diameter of about 0.20 microns. However, it is preferred to use an asbestos fiber having a diameter of about 0.025 to 0.10 micron and a length of about 5 microns. Asbestos fibers having a larger diameter tend to produce a separator having a larger pore size than is desired. No. 6 fuel cell asbestos from Johns-Manville Corp. can be used. Other asbestos fibers of suitable diameter (0.025 – 0.20 microns) and greater lengths can be utilized in small amounts with the shorter fibers but cause excessive thickening of the suspensions in large amounts.

We prefer to use commercially available small polytetrafluoroethylene (e.g. Teflon) fibers for the separator of this invention. The commercially available fibers approaching colloidal size are particularly effective. These fibers provide greater separator strength, since they are highly irregular in shape and seem to provide an added mechanical locking effect. We prefer to use polytetrafluoroethylene fibers having an average diameter of about 5 – 7 microns and an average length of about 30 – 40 microns. Smaller fibers may even provide better results and reduce the weight proportion of polytetrafluoroethylene fibers needed. A polytetrafluoroethylene fibrous material of preferred fiber size that can be used in Teflon T-7, available from E. I. duPont deNemours & Co., Inc. At least about 20% by weight of such polytetrafluoroethylene fibers are necessary to obtain good physical properties, including strength and dimensional stability. On the other hand, amounts of such polytetrafluoroethylene fibers greater than about 40% tend to make the separator hydrophobic, and increase electrical resistance through the electrolyte between the electrodes in the cell. In general we prefer to use about 25 to 30% by weight of such polytetrafluoroethylene fibers.

About 5 to 15% by weight of the ethylene-propylene copolymer is preferred in our separator. Any molecular weight commercially available copolymer of ethylene and propylene will work, provided it has a melting point temperature that is at least about 50° F. below the polytetrafluoroethylene fiber sintering temperature, and at least about 50° F. above the maximum cell operating temperature. As previously indicated, the copolymer bonds the balance of the separator materials together. It thus cooperates with the polytetrafluoroethylene fibers to impart physical strength to the separator. A melting point of about 500° to 550° F. would be satisfactory in most applications. One such commercially available copolymer is Teflon FEP-120 Emulsion available from E. I. duPont deNemours & Co., Inc. At least about 5% by weight of the copolymer is necessary in order to have any appreciable strength. On the other hand, proportions greater than about 20% by weight tend to reduce porosity, increase interelectrode resistance, and reduce wettability, while providing no increased benefits in strength. It is preferred to use a copolymer which initially has an average particle size of 0.25 to 0.50 microns. This particle size assures optimum intermixing with the balance of the separator material constituents. Any particle size up to about 2 microns can be used.

The separator material of this invention is prepared in a modified paper making process, with isopropanol being used as a liquid carrier for suspending and mixing the separator constituents. The alkaline earth metal oxide needed in the separator as formed is included as magnesium hydroxide. On drying, the hydroxide forms an oxide. Magnesium hydroxide can be produced in situ by adding a soluble magnesium salt such as magnesium acetate to an isopropanol mixture containing about 4% by volume concentrated ammonium hydroxide. This latter procedure is preferred.

Serving as one specific example of the method of this invention is the following process descritpion. 500 Milliliters of isopropanol were placed in the mixing container of a food blender, such as Waring commercial model No. 1120. The container was placed in mixing position of the blender. 5.0 grams of dry shredded No. 6 fuel cell asbestos fibers were added to the isopropanol while the blender was running at slow speed. While the blender was running at the same slow speed, 2.5 grams of Teflon T-7 particles and 2 milliliters of Teflon FEP-120 Emulsion were added, along with 20 milliliters of concentrated ammonium hydroxide (37% by weight ammonium hydroxide). A solution of 300 grams magnesium acetate tetrahydrate in a 1:1 by volume isopropanol-water solvent was prepared. 10 Milliliters of this solution was added to the blender at the same slow mixing speed. The cover was then placed on the mixing container, and the blender run at maximum speed. This produced a uniform suspension of particle and fiber agglomerates. The agglomerates are of fairly large size as high speed mixing starts. They are gradually reduced in size as the high speed mixing continues. The high speed mixing, with the accompanying significant shearing action is continued until the agglomerates in the suspension were reduced to an average diameter of about 5 to 15 microns. This usually took about 5 minutes. Meanwhile, a sheet of unprinted newsprint paper was placed on a vacuum table, which had a surrounding damming. The newsprint paper was moistened with isopropanol. When the blender was turned off, the suspension was immediately poured onto the vacuum table through a 16 size mesh copper screen. The screen retained undesirably large agglomerates.

A layer of the suspension that was about 0.50 cm thick was formed on the vacuum table. A layer thickness of about 0.50 to 1.5 cm is generally preferred. A vacuum was then applied to the underside of the vacuum table to separate the carrier liquid from the agglomerates. This produced a uniform layer of wet agglomerates on the newsprint paper. The newsprint paper carrying the wet agglomerate layer was then removed from the vacuum table and dried for 2 minutes at approximately 120° C. It was then cooled to room temperature and pressed against a polyethylene film under a pressure of 54 kilograms per square centimeter.

After pressing the protective polyethylene sheet was removed, and the newsprint paper carrying the agglomerate layer was dried again at about 120° C. for approximately 5 minutes. At this point the agglomerate layer formed a coherent sheet. The newsprint paper was peeled away from it and the sheet was immediately heated to a temperature of approximately 345° C. for about 5 minutes. This higher temperature heating can be performed with or without an intervening cooling to room temperature. The higher temperature heat treatment fuses the copolymer particles to bond the separator constituents together to form a self-supporting separator sheet material. The sheet was then cooled to room temperature, and was ready for use after being cut to size.

The sheet of separator material was 0.007 inch thick and had an average pore size of less than about 0.20 microns. It has a porosity of about 40% and was readily wetted by strong potassium hydroxide solutions. It was resistant to chemical attack and did not swell at all after long periods of soaking in aqueous solutions containing 33 – 45% by weight potassium hydroxide.

Figure 2:
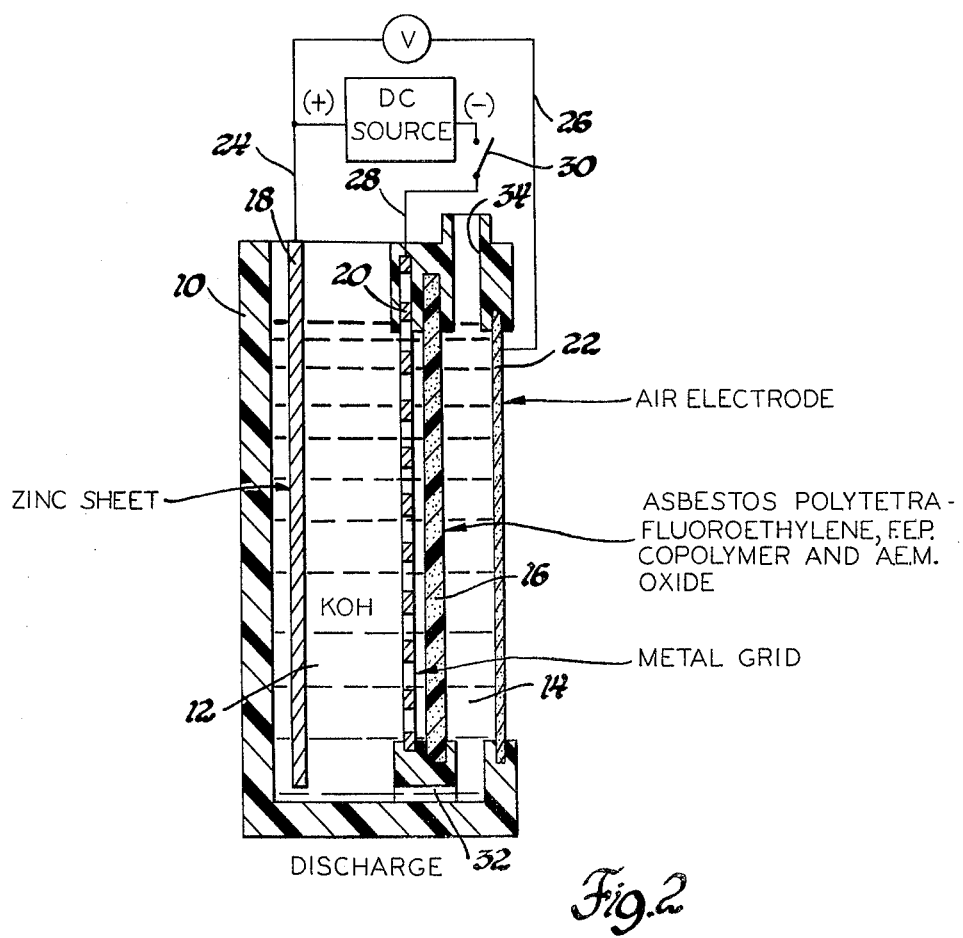
FIG. 2 shows a sectional view of a rechargeable zinc-air hybrid fuel cell having an ion permeable barrier made with the separator material described herein. The cell is shown during discharge.

FIG. 1 shows a finished separator ready for use in an electrochemical cell, as for example the electrochemical cell such as shown in FIG. 2.

Attention is now directed to FIG. 2, which shows an improved zinc-air hybrid fuel cell which can be made using the separator material hereinbefore described. FIG. 2 shows a cup-shaped container 10 that is divided into two chambers 12 and 14 by a transverse wall member 16 made out of the separator material of this invention. Container 10 is rectangular in horizontal and vertical cross section. Chamber 12 contains a flat plate 18 of zinc metal serving as an anode for the fuel cell. Also in chamber 12 is a flat sheet-like nickel plated copper grid 20 that is parallel zinc anode 18 and serves as an auxiliary electrode. Auxiliary electrode 20 serves as a charging electrode, that is a counterelectrode for zinc electrode 18 when the cell is being recharged.

Separator 16 forms a common wall, or inner wall, between chambers 12 and 14. The outer wall of chamber 14 is formed by an oxygen electrode 22. The outer face of oxygen electrode 22 is exposed to ambient air while the inner face of oxygen electrode 22 is exposed to cell electrolyte filling chamber 14. Cell electrolyte also substantially fills chamber 12. The cell electrolyte is concentrated potassium hydroxide (45% by weight potassium hydroxide in water).

A wire 24 connected to zinc electrode 18 and a wire 26 connected to oxygen electrode 22 provide means for receiving a voltage generated between these two electrodes during cell discharge. A wire 28 is connected to auxiliary electrode 20. Wire 28 is in turn connected to switch 30 which lies between a source of DC potential and the wire 24 connected to zinc electrode 18. The source of DC potential is biased to apply a positive potential to the zinc electrode and a negative potential to the auxiliary electrode for recharging the zinc electrode 18.

Container 10 has a passageway 32 beneath auxiliary electrode 20 and separator wall 16 that directly communicates chambers 12 and 14. Container 10 is open over chamber 12 and closed except for a gas port 34 over chamber 14. Passageway 32 and gas port 34 are of significance during cell recharge, as will hereinafter be described.

It is to be recognized that zinc electrode 18 could form an outside wall for chamber 12, as oxygen electrode 22 does for chamber 14. Moreover, it is not necessary that container 10 be in the shape of a cup. It is only essential this way for ease of illustration. The container need not be a discrete and separate member at all. For example zinc electrode 18, auxiliary electrode 20 and oxygen electrode 22 can each be made with a thick surrounding plastic frame that is registerable with the other frames. The frames are stacked in register and clamped together to form, in combination with the zinc and oxygen electrodes, a closed container. Diaphragm 16 can be a sheet about the same size as the outer periphery of the frames. When it is clamped in place between the auxiliary electrode frame and the oxygen electrode frame, it divides the container into two chambers. The frame members in such a construction are of a predetermined thickness to provide a desired spacing between the various electrodes as well as cell chambers of desired volume. Appropriate openings in the frame members are provided in such a construction for circulation of electrolyte at least through the zinc electrode chamber. The oxygen electrode chamber can communicate with the zinc electrode chamber through a passageway in the auxiliary electrode frame. A reservoir and pampering means connected to the frame opening so the zinc electrode chamber can be used to circulate elelctrolyte.

Figure 3:
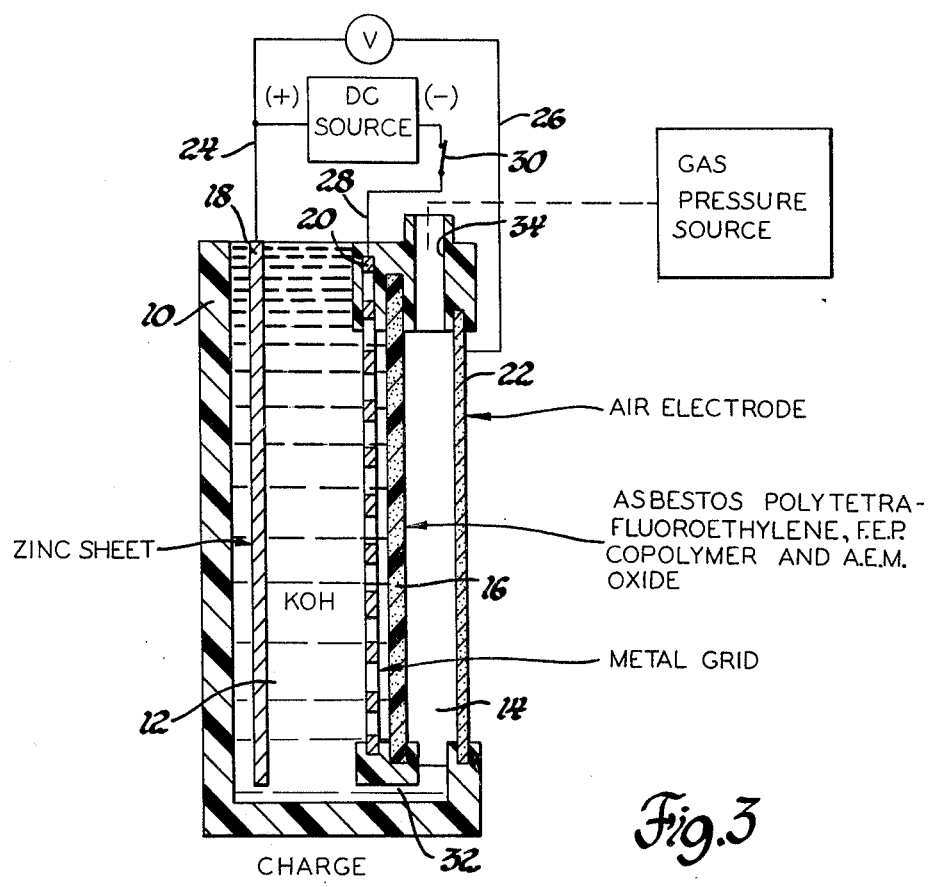
FIG. 3 shows a sectional view of the fuel cell shown in FIG. 2 during charging.

As previously mentioned, FIG. 2 shows the cell of this invention while the cell is being discharged. Reference is now made to FIG. 3, which shows this same cell while it is being charged. As a preparation for charging, a gas pressure is applied to passageway 34. This creates a pressure differential between chambes 12 and 14 that separator wall 16 must withstand. Because of this pressure differential, electrolyte flows out of chamber 14 into chamber 12 through the communicating passageway 32. A sufficient pressure is applied to depress the level of the electrolyte in chamber 14 to the bottom of that chamber, at least to a level below where the electrolyte is no longer in contact with the oxygen electrode 22. This electrically isolates oxygen electrode 22 from zinc electrode 18. The cell is then ready for recharging. Switch 30 is closed anc charging current passed between zinc electrode 18 and auxiliary electrode 20. An overvoltage is usually applied during charging. This liberates oxygen at the auxiliary electrode 20. The oxygen liberated can produce a vigorous bubbling action that causes separator wall 16 to vibrate. The diaphragm of our invention will withstand such vigorous action without degradation.

After zinc electrode 18 has been recharged, switch 30 is opened. Pressure on passageway 34 is then relieved, and electrolyte allowed to refill chamber 14 to the normal level shown in FIG. 2. The recharged cell is then ready again for discharge and generation of electrical power.

Figure 4:
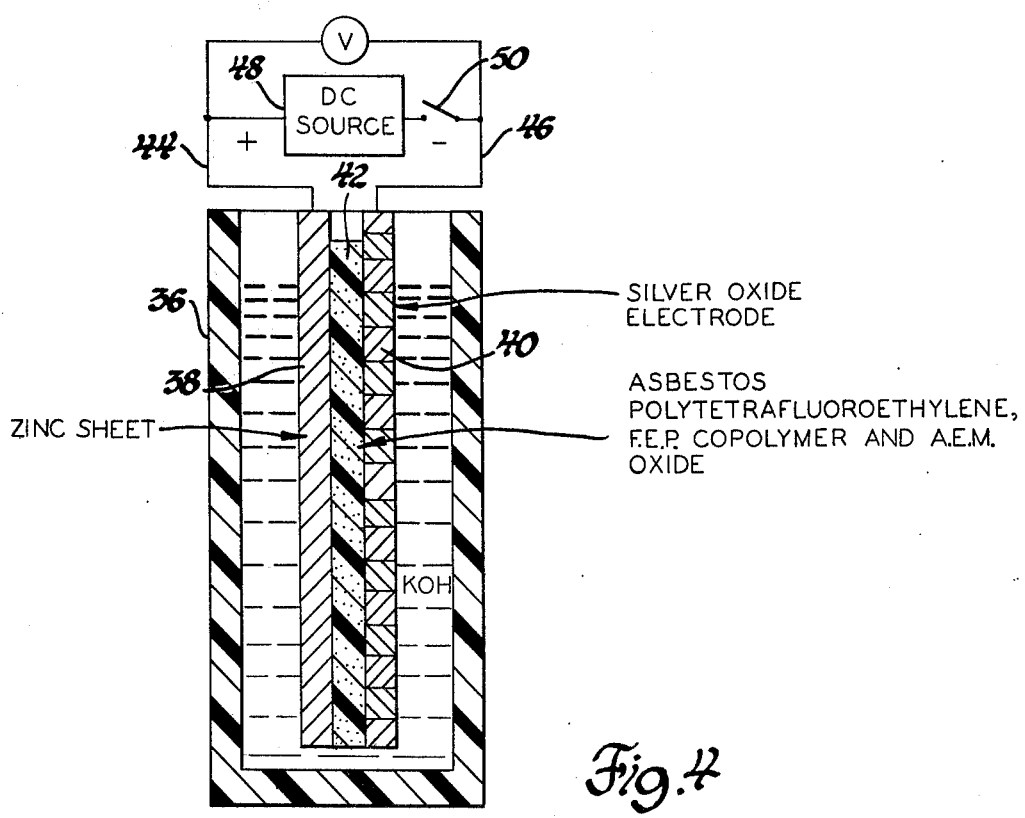
FIG. 4 shows a zinc-silver oxide secondary battery having an electrode separator made in accordance with this invention.

FIG. 4 shows a secondary battery of the more conventional type which can be made using an ion permeable separator made in accordance with this invention. Improved results are obtained with our separator in secondary cells of this type because or diaphragm material is particularly resistant to zinc dendrite penetration and presents a lower electrical resistance between the electrodes. It is well known that dendrites form on the inner surface of the zinc electrode during recharge. The more charge-discharge cycles that occur, the longer these dendrites become. The longer they become, the more likely that they will penetrate separator 42 and form a direct short between the anode and cathode. Since our separator material is resistant to dendrite penetration, secondary cells having zinc electrodes can be made that will withstand a larger number of charge-discharge cycles and therefore have longer life. FIG. 4 shows a container 36 having a flat plate 38 of zinc serving as an anode. A flat nickel plated grid 40 having voids filled with silver oxide serves as the cathode. Anode 38 and cathode 40 are separated by a sheet-like separator 42 made in accordance with this invention. The thickness of diaphragm 42 can be approximately 0.009 to 0.010 inch. Container 36 is filled with concentrated potassium hydroxide (33% by weight potassium hydroxide in water). Accordingly, diaphragm 42 is saturated with electrolyte to provide ionic communication between electrodes 38 and 40. A wire 44 connected to zinc electrode 38 and a wire 46 connected to the silver oxide electrode 40 provide means for receiving the potential generated between these two electrodes. Connected between wires 44 and 46 is a source of DC potential 48 and a switch 50. DC source 48 is approximately biased by a positive potential to zinc electrode 38 and silver oxide electrode 40. On closing switch 50 the cell can be recharged in the usual manner.

We claim:
1. An alkaline electrolyte voltaic cell electrode separator having a high hydrophilicity, wet strength, resistance to chemical degradation, and dimensional stability and having a low electrical resistance to complementary separated electrodes, said separator comprising:
  about 10 to 15% by weight of an alkaline earth metal oxide,
  30 to 70% by weight asbestos fibers,
  20 to 40% by weight unsintered polytetrafluoroethylene fibers, and
  about 5 to 20% by weight of a fluorinated ethylene-propylene copolymer bonding said oxide, said asbestos fibers and said unsintered fibers of polytetrafluoroethylene together.

2. An alkaline electrolyte voltaic cell electrode separator having a high hydrophilicity, wet strength, resistance to chemical degradation, and dimensional stability and having a low electrical resistance to complementary separted electrodes, said separator comprising a sheet-like porous body containing:
  10 to 15% by weight of an alkaline earth metal oxide selected from the group consisting of magnesium oxide and magnesium hydroxide,
  40 to 60% by eight asbestos fibers having an average length less than about 5 microns and an average diameter less than about 0.1 microns with an average length to width ratio greater than about 50:1, respectively,
  25 to 30% by weight unsintered polytetrafluoroethylene fibers having a length less than about 40 microns and a diameter of less than about 7 microns,
  5 to 15% by weight of fluorinated ethylene-propylene copolymer bonding the afore-mentioned substances together,
  said body member having pores as formed that have an average diameter of about 50 – 100 angstroms, and
  sub-colloidal particles of a substance selected from the group consisting of magnesium oxide and magnesium hydroxide within said pores and reducing average pore diameter to about 10 – 25 angstroms.

3. A method of making a strong chemically inert dimensionally stable film that is highly permeable to ions and resistant to zinc dendrite penetration comprising the steps of:
  adding to a liquid carrier, by total weight of the added substances, 40 to 60% shredded asbestos fibers, 25 to 35% polytetrafluoroethylene fibers, 5 to 15% colloidal size particles of a fluorinated copolymer of ethylene and propylene, and 10 to 15% subcolloidal size particles of an alkaline earth metal oxide or equivalent amount of a precursor thereof,
  mixing said liquid carrier and said substance to form a suspension of particle and fiber agglomerates,
  blending said suspension at high speed with a significant shearing action until said agglomerates are reduced in average diameter to about 5 – 15 microns,
  pouring said suspension onto a support that is permeable to said carrier and impermeable to said agglomerates,
  separating said carrier from said agglomerates to form a uniform film of said agglomerates,
  drying said film of agglomerates,
  heating said film of agglomerates to a temperature high enough to fuse said particles of fluorinated copolymer of ethylene and propylene but below a sintering temperature for said polytetrafluoroethylene fibers, and
  cooling said film to room temperature.

4. A method of making a strong chemically inert dimensionally stable separator for a secondary electrochemical cell that is highly permeable to ions and resistant to zinc dendrite penetration comprising the steps of:
  adding to an alcohol carrier by total weight of the added substances 40 to 60% by weight asbestos fibers having a maximum average diameter and length respectively of about 0.1 micron and 5 microns, 25 to 35% by weight polytetrafluoroethylene fibers having a length less than about 40 microns and a diameter of less than about 7 microns, and 5 to 15% generally colloidal size particles of a fluorinated copolymer of ethylene and propylene, mixing said alcohol carrier and said substances to form a suspension of particle and fiber agglomerates, blending said suspension at high speed with a significant shearing action until said agglomerates are reduced in average diameter to less than about 10 microns, pouring said suspension onto a horizontal support member permeable to said alcohol and impermeable to said agglomerates, applying a vacuum to the underside of said support to separate said alcohol from said agglomerates and form a uniform film of said agglomerates, drying said film of agglomerates, heating said film of agglomerates to a temperature high enough to fuse said particles of fluorinated copolymer of ethylene and propylene but below a sintering temperature for said polytetrafluoroethylene fibers to bond said agglomerates together and form a separator film of about 0.005 to 0.010 inch in thickness, cooling said film to room temperature, and impregnating said film with subcolloidal particles of an alkaline earth metal oxide, or precursor thereof, to produce a pore size in said film of less than about 25 angstroms.

5. A zinc-air hybrid fuel cell comprising a container and in said container a zinc anode, an oxygen cathode, an auxiliary electrode spaced between said anode and cathode and serving as a charging electrode, an alkaline electrolyte for ionically communicating said anode, cathode and auxiliary electrode, an ion permeable sheet-like member between said auxiliary electrode and said oxygen anode, said sheet-like member including about 10 to 15% by weight of an alkaline earth metal oxide, about 40 to 60% by weight asbestos fibers of a length less than about 5 microns, about 20 to 35% by weight unsintered polytetrafluoroethylene fibers having a length less than about 40 microns, and about 5 to 15% by weight of a fluorinated ethylene-propylene copolymer bonding at least said fibers together to form a sheet-like body having a pore size as formed of less than about 0.20 microns, said sheet-like member separating said container into two chambers, one of said chambers containing said zinc anode and said auxiliary electrode, the other of said chambers containing said oxygen cathode, means for receiving a voltage generated between said zinc anode and said oxygen cathode, means including a passageway around said sheet-like member for alternately removing electrolyte from said other chamber and returning it, and means for applying a charging voltage across said anode and auxiliary electrode while electrolyte has been removed from said other chamber.

6. An alkaline electrolyte voltaic cell electrode separator having a high hydrophilicity wet strength resistance to chemical degradation and dimensional stability and having a low electrical resistance to complementary separated electrodes, said separator comprising a sheet-like porous body containing:

about 10 – 15% by weight of an alkaline earth metal oxide;

about 40 to 60% by weight asbestos fibers of a length less than 5 microns;

about 20 to 35% by weight unsintered polytetrafluoroethylene fibers having a length less than about 40 microns; and about 5 to 15% by weight of a fluorinated ethylene-polymer copolymer bonding at least said fibers together to form a sheet-like body having a pore size as formed of less than about 0.20 microns.

* * * * *